(12) United States Patent
Oaks (10) Patent No.: US 7,309,509 B1
(45) Date of Patent: Dec. 18, 2007

(54) DISPENSABLE CHOCOLATE MUSH MELTAWAY AND METHOD OF MAKING

(76) Inventor: William C. Oaks, 3456 Bradley Rd., Omro, WI (US) 54935

( * ) Notice: Subject to any disclaimer, the term of this patent is extended or adjusted under 35 U.S.C. 154(b) by 651 days.

(21) Appl. No.: 10/741,342

(22) Filed: Dec. 22, 2003

(51) Int. Cl.
*A23G 7/02* (2006.01)

(52) U.S. Cl. ....................... 426/631; 426/519

(58) Field of Classification Search ............... None
See application file for complete search history.

(56) References Cited

U.S. PATENT DOCUMENTS

| | | | |
|---|---|---|---|
| 3,594,193 A * | 7/1971 | Mishkin et al. ............. 426/566 |
| 4,031,261 A * | 6/1977 | Durst ......................... 426/565 |
| 4,059,047 A | 11/1977 | Sollich |
| 4,145,452 A * | 3/1979 | Cousin et al. .............. 426/321 |
| 4,178,105 A | 12/1979 | Sollich |
| 4,648,315 A | 3/1987 | Blum |
| 4,661,366 A | 4/1987 | Pinto et al. |
| 4,892,033 A | 1/1990 | Sollich |
| 4,907,502 A | 3/1990 | Snyder, Jr. |
| 5,275,835 A | 1/1994 | Masterson et al. |
| 5,279,846 A * | 1/1994 | Okumura ................... 426/601 |
| 5,288,513 A * | 2/1994 | Cain et al. ................. 426/660 |
| 5,362,508 A * | 11/1994 | Wheeler et al. ........... 426/302 |
| 5,385,744 A * | 1/1995 | Cain et al. ................. 426/89 |
| 5,445,844 A * | 8/1995 | Woolf et al. ............... 426/580 |
| 5,947,014 A | 9/1999 | Koch |
| 6,145,701 A * | 11/2000 | Van Der Merwe et al. ... 222/40 |
| 6,152,019 A | 11/2000 | Heyde |
| 6,395,314 B1 | 5/2002 | Whalen et al. |
| 2004/0151816 A1* | 8/2004 | Nana et al. ................. 426/548 |

OTHER PUBLICATIONS

Wolf-Cohen, Elizabeth, 1994. Step-by Step Irresistable Chocolate. Smithmark Publishers, Inc. p. 12 & 77.*

* cited by examiner

*Primary Examiner*—Carolyn Paden
(74) *Attorney, Agent, or Firm*—Ryan Kromholz and Manion (57) ABSTRACT

The present invention is a chocolate mush meltaway that is dispensed from a temperature or torque controlled shake freezer machine and that conforms in shape to a receptacle into which it is dispensed. The mush meltaway is made from a selected mixture of chocolate, oil, and fluor salt. Optionally, a flavor can be added to the mixture. The chocolate is melted and then the oil and salt are mixed with the chocolate. The mixture is transformed into a semi-solid chocolate mush meltaway having a selected viscosity in a torque controlled shake freezer machine. The machine automatically and intermittently operates to maintain the desired viscosity and consistency of the mush meltaway, which is similar to soft-serve ice cream. The proper viscosity and consistency are maintained independent of the actual temperature of the mush meltaway. The chocolate mush meltaway is dispensed into the receptacle at a selected time for immediate consumption.

23 Claims, 7 Drawing Sheets

PRIOR ART

DISPENSABLE CHOCOLATE MUSH MELTAWAY AND METHOD OF MAKING

BACKGROUND OF THE INVENTION

1. Field of the Invention

The present invention relates to a chocolate mush meltaway that is dispensable from a torque controlled dispensing machine and that conforms in shape to a container into which it is dispensed.

2. Description of the Related Art

Figure 1:
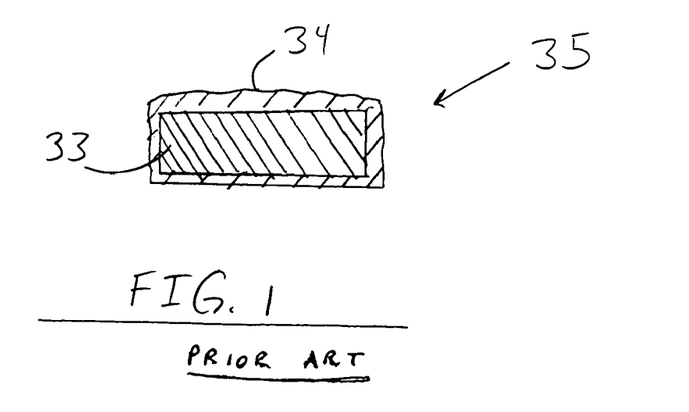
FIG. 1 is a cross-sectional view of a conventional chocolate candy piece.

Referring first to FIG. 1, a typical piece of chocolate candy 35 is illustrated. The candy piece 35 has two major components, a center 33 and a coating 34. As is well known, the center 33 may be any of a wide variety of products such as flavored cremes and caramel. It is also well known to add nuts to the center. Similarly, a wide variety of products can be used for the coating 34. A very common coating is a chocolate product.

A particularly desirable product for the center 33 is a meltaway. As used in the context of this invention, the word "meltaway" means a mixture of ingredients that contain chocolate, oil, and fluor salt. A "meltaway" may optionally contain a flavor. Accordingly, a combination of chocolate, oil, and salt is considered to be a meltaway whether or not the combination contains a flavor.

In turn, the word "chocolate" as used in the context of the present invention means any of a variety of ingredients that are understood by persons skilled the candy making arts to be based on chocolate. Without being limited, the word "chocolate" includes ingredients of real chocolate containing cocoa butter and/or chocolate liquor. Real chocolate may be milk, dark, or white chocolate. The word chocolate further includes confectionery coatings as know in the art that contain vegetable oil, and such may be milk, dark, white, or peanut coatings. The word chocolate further includes pastel coatings containing vegetable oils, and the pastel coatings may be white, peanut, pink, green, yellow, red, or other colors. Moreover, the word chocolate includes sugar-free coatings such as are marketed under the trademarks Mannitol, Maltitol, and Lactitol. The sugar-free coatings are available as milk, dark, and white chocolate. They are cocoa butter and chocolate liquor based and are not vegetable oil. Finally, the word chocolate includes products typically used as ice cream coating or liquid ice cream chips. Each of the chocolate ingredients listed above is typically a solid at ordinary room temperatures and has its own particular melting point.

As used in the context of the present invention, the word "oil" includes ingredients of saturated fats, unsaturated fats, polyunsaturated fats, monounsaturated fats, and fat substitutes. Further, the word "oil" means any combination of the foregoing kinds of fats. Each of the oil ingredients listed has its own specific melting temperature.

As used in the context of the present invention, the word "salt" or "fluor salt" means ingredients of ordinary sodium chloride in granular or flake form, as is known in the candy making industry.

As used in the context of the present invention, the word "flavor" includes specialty flavoring ingredients well-known in the candy arts such as malt, nuts, fruits, peanut butter, vanilla, mint, maple, coffee, raspberry, orange, lemon, and cherry.

A particular prior meltaway center 33 is made from any desired combination of chocolate, oil, and fluor salt, and optional flavor. The physical characteristics of the meltaway is determined by the particular chocolate ingredient, oil ingredient, and salt ingredient. Important physical characteristic include taste, color, melting temperature, and consistency at approximate room temperature.

A typical prior meltaway center 33 is manufactured from a chocolate ingredient of a real chocolate containing cocoa butter such as is marketed by the Blommer Company. That chocolate ingredient has a melting temperature of approximately 90 to 95 degrees F. The oil ingredient is a coconut oil such as is marketed under the trademark Konut having a melting point of approximately 76 degrees F. The ratio of chocolate to oil is approximately five parts chocolate to one part oil by weight. For a quantity of approximately 40 pounds of chocolate and eight pounds of oil, two ounces of fluor salt, such is available from the Cargil Company, are used. However, the exact amount of salt used can vary to suit the taste.

The chocolate ingredient is melted in a melting machine to approximately 140 degrees F. in known manner, at which temperature it is a liquid. After a short stirring time such as about five minutes in the melting machine, the liquid chocolate is poured into a large kettle such as a Hobart M-80 kettle that is used with Hobart Model 800 mixing machines. Then the oil and fluor salt are added, along with any optional flavor. At this point, the mixture temperature is about 120 degrees F., and its viscosity is on the order of cream. The kettle is transferred to the mixing machine, which is fit with a whipper paddle. The mixing machine is located in a temperature controlled room of approximately 65 to 70 degrees F., and preferably about 68 degrees. The ingredients are stirred and slowly cooled over several hours. As the mixture approaches 87 degrees F., it starts to thicken. The room temperature cannot be too much below the melting point of the mixture or the mixture will freeze on the edge of the Hobart kettle. The mixture is stirred until it reaches about 75 to 77 degrees. At that point, the mixture is a semi-solid similar to warm butter, soft-serve ice cream, or soft-serve ice milk. Like butter, the mixture will stay as a liquid when the room temperature is too warm, but at cool temperatures the mixture becomes hard.

Figure 2:
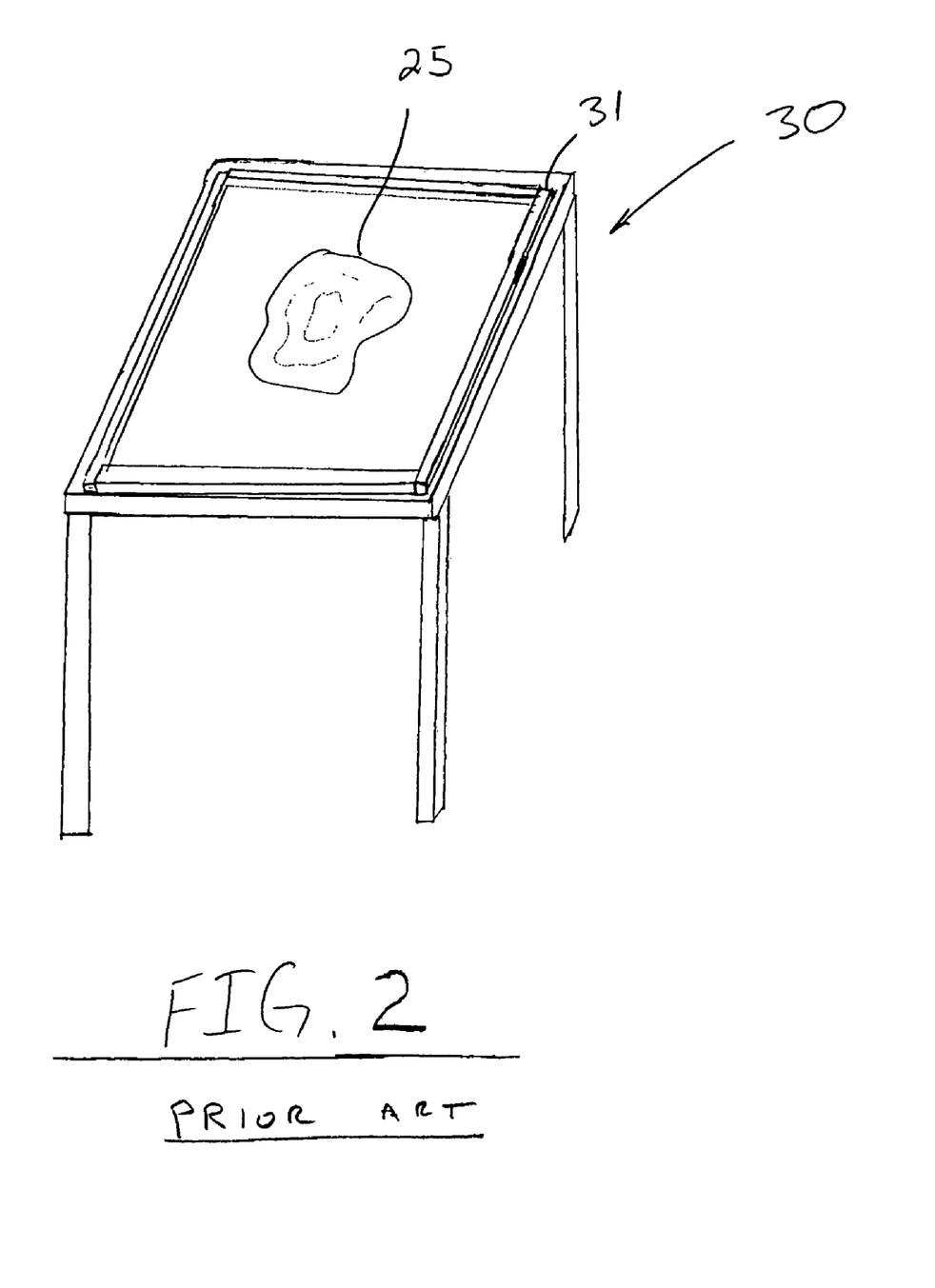
FIG. 2 is a perspective view of a semi-solid meltaway mixture on a table.

The mixture, indicated by reference numeral 25 in FIG. 2, is poured onto a table 31 in the temperature controlled room and spread out. The temperature of the room and table 30 further cool the mixture to about 65 to 70 degrees. At that temperature, the mixture spreads evenly and hardens to form a slab 26, FIG. 3. Side bars 31 are placed on the table 30 to define an area for spreading the semi-solid mixture 25 on the table. The next step is to use cutters 32 to cut the slab 26 into small meltaway pieces 33'. Lastly, the small pieces of meltaway 33' are coated with a chocolate coating, such as the chocolate coating 34, to form the end piece of candy 35. The coating 34 has a higher melting temperature than the melting temperature of about 837 degrees for the meltaway, so that the candy piece can be handled without melting.

Figure 3:
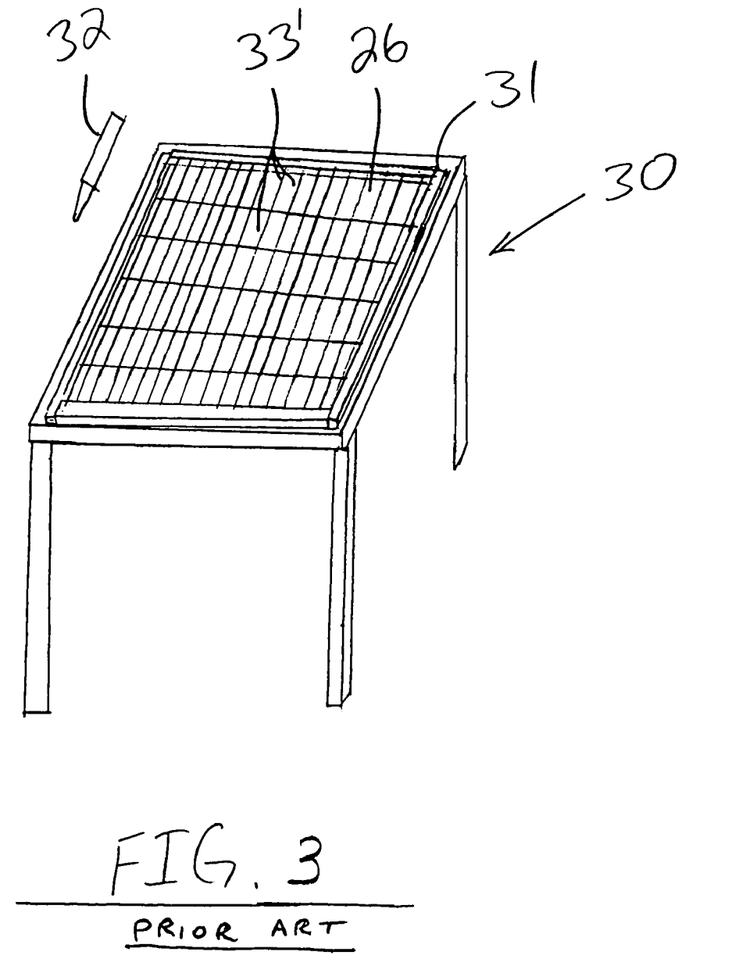
FIG. 3 is a perspective view showing the meltaway mixture that has hardened to form a slab and that has been cut into small meltaway pieces.

It will be appreciated, of course, that the particular melting temperatures and other characteristics of the meltaway 33' described are determined by the specific real chocolate, coconut oil, and fluor salt used, as well as to their specific proportions. Other proportions of the same ingredients will result in different mixture and end product characteristics. For example, nine pounds of oil will make a softer meltaway, and seven pounds of oil makes a thicker and denser meltaway than the one made with the eight pounds of oil described above. Similarly, a different chocolate ingredient and salt ingredient will result in different intermediate characteristics and end results.

Whatever the specific chocolate, oil, and fluor salt used, the finished prior meltaway 33 is a very tasty and popular product, and very large numbers of them are made and consumed daily. On the other hand, at present the desirable flavor of the meltaway is available only in combination with the coating 34. That is because although at normal room temperatures of approximately 70 degrees F. the meltaway is a solid candy piece 33 (but undipped in a coating 34), the meltaway piece would melt in a person's hand having a body temperature of about 98 degrees. The meltaway would therefore become intolerably messy. In fact, at a temperature of about 75 to 80 degrees, the meltaway breaks down into a mushy state, and at about 80 to 90 degrees the meltaway melts completely. Consequently, handling the meltaway 33' in the semi-solid state above temperatures of about 65 to 70 degrees previously occurred only as an intermediate step in the manufacture of candy pieces 35. As a result, consumers were previously unable to obtain or enjoy just the meltaways, such as in a retail store setting.

SUMMARY OF THE INVENTION

The present invention relates to a mush meltaway that is conveniently handled by consumers. As used in the context of the present invention, a "mush meltaway" means a meltaway that has the consistence of warm butter, custard, or soft-serve ice cream at ordinary room temperatures and that is dispensed from a dispensing machine into a receptacle as an individual serving.

The mush meltaway of the present invention comprises selected ingredients of chocolate, oil, and fluor salt as those terms were defined previously. Optionally, a flavor as previously defined can be added. A mush meltaway as that term is used herein therefore may or may not include a flavor.

The selected ingredients are mixed in the manner for making meltaways 33' as described above. That is, a selected amount of melted chocolate is first drawn from a chocolate warmer and placed into a kettle. All other ingredients are then added to the kettle. The ingredients are thoroughly mixed. The resulting mixture is then transferred to storage containers until ready for use according to the present invention. Ideally, the mixture is stored at a temperature above the melting point of the particular chocolate ingredient.

In accordance with the present invention, the mixture is transformed into a semi-solid mush meltaway that is conveniently handled by consumers in a sanitary manner. This is accomplished by subjecting the mixture to a temperature at which it acquires the consistency of soft butter, custard, or soft-serve ice cream in a dispensing machine, and dispensing the mixture as a mush meltaway from the machine into a small receptacle such as a wafer cone or dish.

The dispensing machine may be a torque controlled shake freezer machine having a mix hopper, a freezing tunnel with a viscosity sensor, a viscosity control, and a dispenser. The mix hopper is first filled with mixture. A selected amount of the mixture is then drawn into the freezing tunnel, where it is mixed and cooled. The machine indirectly measures the mixture viscosity by sensing the resistance produced by the mixture on an arm rotating in the freezing tunnel. In other words, the torque required to rotate the arm is a measure of the mixture viscosity and consistency, which, in turn, are determined by the particular ingredients, proportions, and melting points. The viscosity control is adjusted such that the freezing tunnel ceases to cool the mixture when the viscosity sensor senses that the mixture has hardened to the desired consistency of the mush meltaway. The freezing tunnel intermittently and automatically runs thereafter to maintain the desired consistency of the semi-solid mixture.

The temperature in the freezing tunnel never lowers much below the melting point of the mixture, so that the mixture always stays in a mushy state.

Several advantages are associated with using a torque controlled shake freezer machine. For example, it can be difficult to predict the exact temperature where the mush meltaway will achieve the desired viscosity or consistency. This difficulty is apparent because of the wide variety of different ingredients that can be used for a mush meltaway 33', and as well as their different proportions. For example, using relatively more oil in the mixture will cause the melting temperature of the mixture to lower. On the other hand, using relatively less oil in the mixture will cause the melting temperature of the mixture to rise. The torque controlled shake freezer machine automatically achieves the desired consistency regardless of the actual temperature of the mixture.

The dispensing machine may also be a temperature controlled soft-serve ice cream or shake freezer machine. In that situation, the machine is modified to cause the freezing tunnel to duplicate what a torque controlled shake freezer machine does automatically. In particular, the thermostat of the temperature controlled machine is altered such that the machine operates in the temperature range of the mush meltaway instead of in the operating range of conventional ice cream products.

Whether the dispensing machine is torque controlled or temperature controlled, hardening of the chocolate in the mush meltawety at temperatures associated with conventional ice cream mixes is not a problem. Automatic and intermittent operation of the shake freezer machine maintains the desired viscosity and consistency of the mush meltaway and eliminates the need for a person to constantly supervise its making.

A further advantage of the present invention is that the need for a coating is eliminated. An edible coating of a relatively high melting temperature is not necessary to handle the mush meltaway. Elimination of the coating is particularly advantageous for those who desire to consume only the mush meltaway without the requirement of consuming a coating as well.

In general, the present invention makes available to consumers soft serve chocolate products in a manner that was not previously possible. The mush meltaway can be consumed along with the container if the receptacle is a wafer cone. Alternately, the mush meltaway can be eaten with a spoon if the receptacle is a glass dish, paper cup, or the like.

Other advantages, benefits, and features of the present invention will become apparent to those skilled in the art upon reading the detailed description of the invention and studying the drawings.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 4:
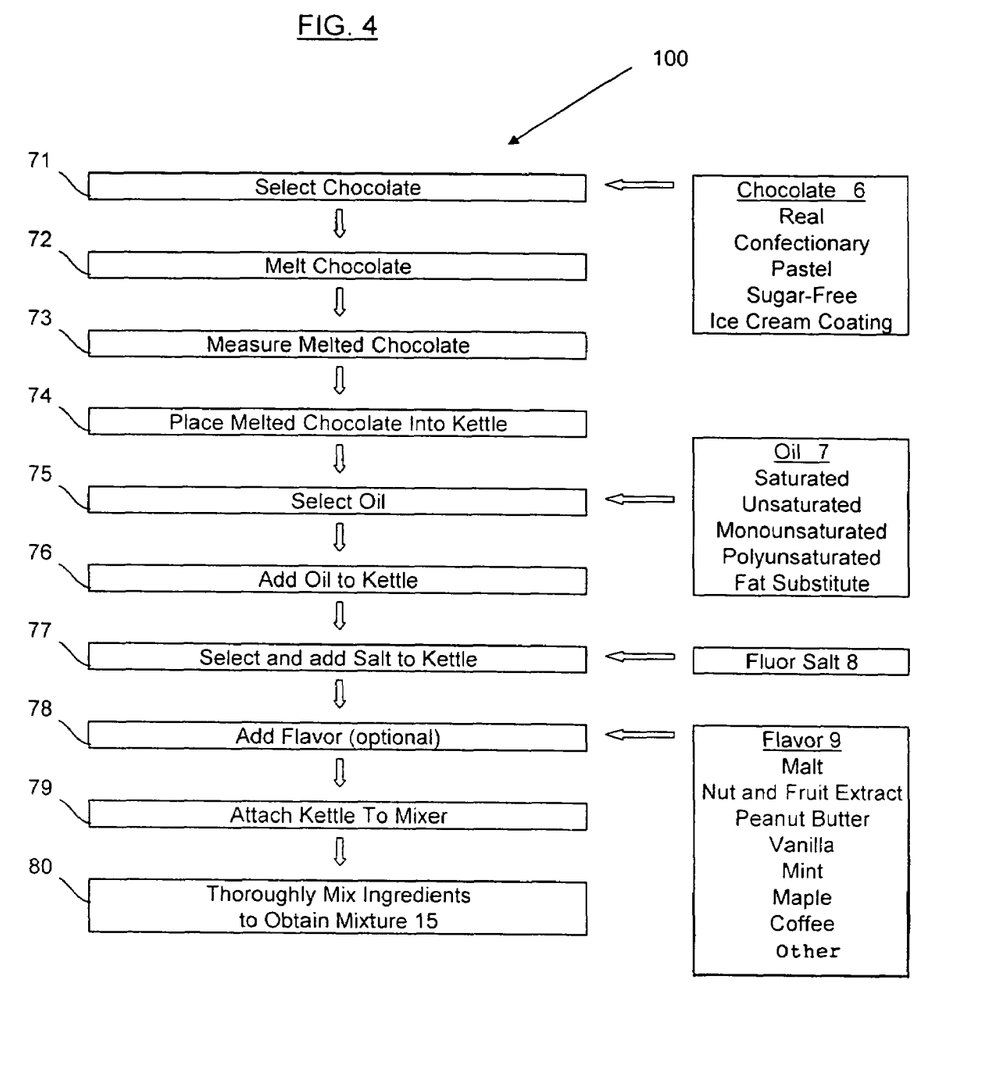
FIGS. 4 and 4A are flow charts showing the method of making the mush meltaway of the present invention.

Looking at FIG. 4, a method 100 is illustrated that illustrates the present invention. Specifically, the method 100 produces a chocolate mush meltaway 50, FIG. 6, that is easily handled by consumers at ordinary room temperatures.

Figure 6:
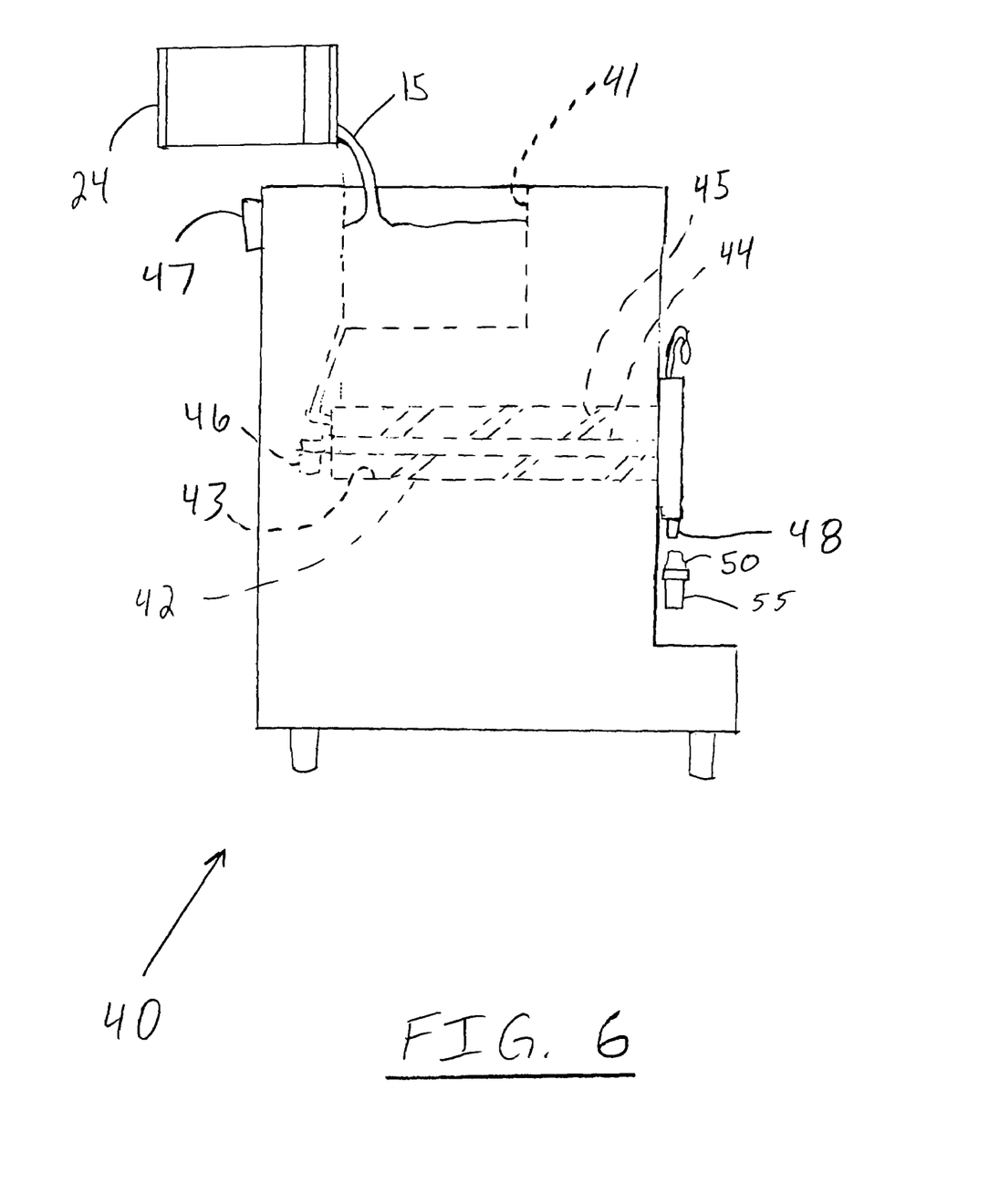
FIG. 6 is a simplified view of the torque controlled shake freezer machine shown in FIG. 5, showing the working parts thereof related to the present: invention.

The chocolate mush meltaway 50 is made up of a chocolate 6, an oil 7, and a fluor salt 8, as those terms are defined earlier herein. The chocolate mush meltaway may optionally include a flavor 9. As previously explained, the chocolate 6 may be any of a variety of ingredients that are understood by persons skilled the candy making arts to be based on chocolate. Without being limited, the chocolate may be real chocolate containing cocoa butter and/or chocolate liquor. Real chocolate may be milk, dark, or white chocolate. The chocolate may be confectionery coatings as known in the art that contain vegetable oil, and such may be milk, dark, white, or peanut coatings. The chocolate may be pastel coatings containing vegetable oils, and the pastel coatings may be white, peanut, pink, green, yellow, red, or other colors. Moreover, the chocolate may be sugar-free coatings such as are marketed under the trademarks Mannitol, Maltitol, and Lactitol. The sugar-free coatings are available as milk, lark, and white chocolate. Finally, the chocolate may be products typically used as ice cream coating or liquid ice cream chips. Each of the chocolate ingredients listed above is typically a solid at ordinary room temperatures and has its own particular melting point.

The oil 7 may be saturated fat, unsaturated fat, polyunsaturated fat, monounsaturated fat, or fat substitutes. Further, the oil may be any combination of the foregoing kinds of fats. Each of the oil ingredients listed has its own specific melting temperature.

The fluor salt 8 is ordinary sodium chloride in granular or flake form.

The flavor 9 may be specialty flavoring ingredients well-known in the candy arts such as malt, nuts, fruits, peanut butter, vanilla, mint, maple, coffee, raspberry, orange, lemon, cherry, or any other desired flavor.

The method 100 comprises the steps of choosing which particular chocolate 6, oil 7, and fluor salt 8, with or without an optional flavor 9, are to be used. Persons skilled in the candy making arts will readily recognize that the final product will vary according to the specific chocolate, oil, and salt used, as well as their relative proportions.

In FIG. 4, the step of selecting the desired chocolate 6 is indicated at reference numeral 71. The chocolate is melted, step 72, in a chocolate warmer, as are well known. It is important that the chocolate is warm enough that it remains in a liquid state when the other ingredients are added to it. The next steps 73 and 74 are to measure a selected amount of the chocolate and transfer it from the warmer to a kettle or other type of mixing container.

After a selected amount of the chocolate 6 is placed in the kettle, the next step 75 is to select a type of oil 7. The oil is added in step 76 to the kettle. Using relatively more oil can make a softer end product, or an end product reaching its desired viscosity at a relatively lower temperature. On the other hand, using relatively less oil can make a thicker more dense end product, or an end product reaching its desired viscosity at a relatively higher temperature. Further, different selections of chocolate and oil will also have an effect on the temperature at which the end product will achieve its desired viscosity and consistency.

Fluor salt 8 to taste is also selected and added to the kettle as step 77. If desired, one or more flavors 9 are optionally added to the kettle as step 78.

The kettle, now having the selected chocolate 6, oil 7, fluor salt 8, and optional flavor 9, is brought to a mixer, step 79. In step 80, the mixer operates to mix the ingredients into a mixture 15. A suitable mixer is a Hobart Model 800 mixer equipped with a whipper paddle. However, other brands of mixers and different paddles can be used without departing from the broad aspects of the present invention. The mixture 15 is mixed until the oil and salt are completely mixed in with the chocolate, and until the salt is dissolved. It may take ten minutes or longer for the mixing to be adequate. At that point, the temperature of the mixture is about 120 degrees F. The mixture viscosity and consistency is thin and on the order of cream. The mixture 15 is transferred from the mixing kettle into a storage container 24, FIG. 6, as step 101, FIG. 4A.

Figure 4A:
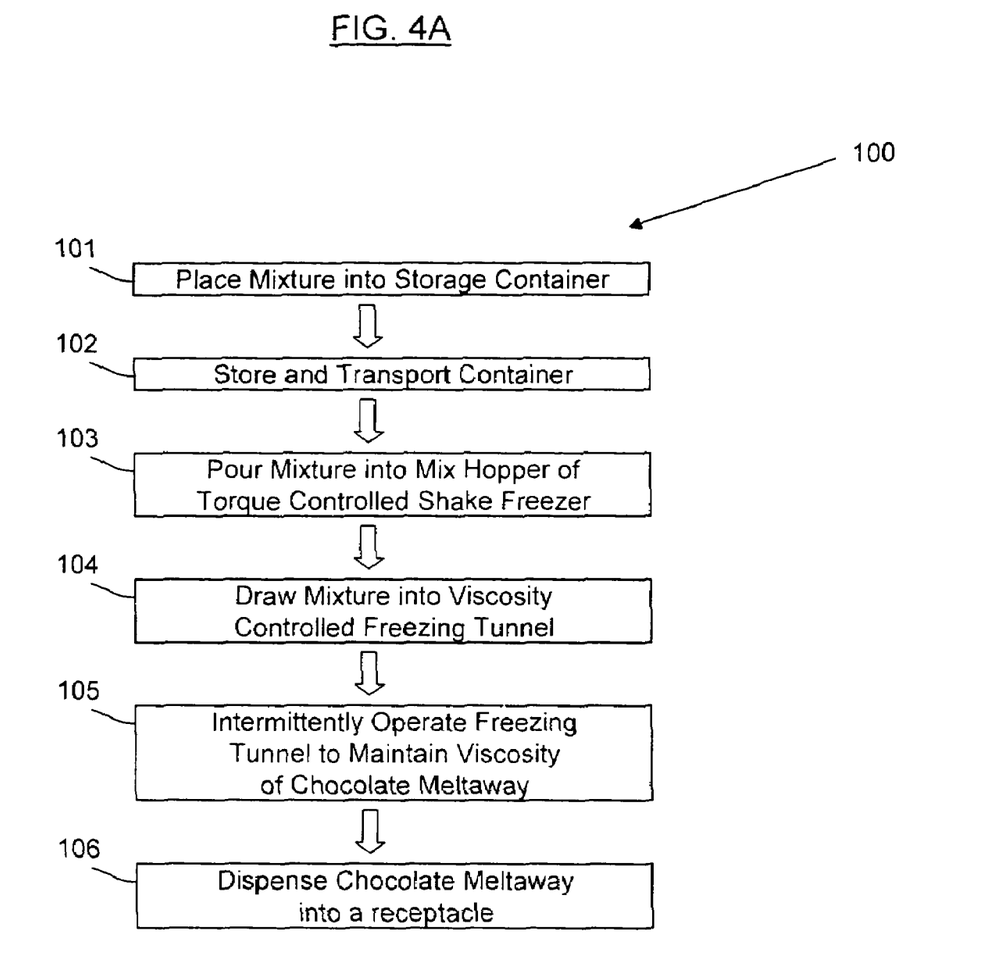

The mixture 15 can be stored in storage containers 24 for a selected period of time before being used in method 100. I have found it preferable to store the mixture in five gallon containers. I have found five gallon containers 24 suitable because that size is convenient to transport from a first location, where the mixture 15 is made, to a second location, where the chocolate mush meltaway 50 of the present invention is made, step 102. Preferably, the mixture is stored at a temperature that is higher than the melting point of the selected chocolate 6. Most preferably, the mixture is stored at a temperature of approximately 95 degrees F. to assure that it stays in the liquid state. In practice, the temperature of the mixture during transport and storage will fluctuate. Hence, the viscosity and consistence of the mixture will vary during shipping storing.

The mixture 15 is prepared for the purpose of being transformed into a soft semi-solid dispensable chocolate mush meltaway 50 that is neatly and conveniently consumable at a dispensing location, FIG. 6. The chocolate mush meltaway has the viscosity and consistency of soft butter, custard, or soft-serve ice cream. In accordance with the present invention, this is achieved by processing the mixture 15 in and dispensing it as individual portions from, a torque controlled shake freezer machine 40.

The mixture 15 in the containers 24 must be at a temperature above the melting point of the particular oil 8 used. Otherwise the mixture will be too thick to easily pour into the torque controlled shake freezer machine 40, step 103. If the mixture temperature is too low, the mixture must be warmed until it is able to be poured into the machine. The best mixture temperature for pouring is approximately 94 degrees F. or higher.

Conventional wisdom suggests that it would be difficult, if at all possible, to create a chocolate mush meltaway in an enclosed cooling machine, such as a conventional temperature controlled shake freezer machine. A representative prior machine for dispensing a soft-serve product such as ice cream is shown in U.S. Pat. No. 6,145,701. The U.S. Pat. No. 6,145,701 discloses a conventional temperature controlled shake freezer machine for soft-serve ice cream and similar products having a freezer tunnel and a beater assembly. Soft-serve ice cream and similar products are dispensed while at temperatures far below ordinary room temperatures. One would expect that the chocolate 6 in the mixture 15 would stick to the wall of the freezer tunnel and interrupt operation of the beater assembly if used with the prior temperature controlled machine. One would also expect that the chocolate would become too thick or hard for the beater assembly to maintain normal operability as the chocolate mixture freezes. Such expectations would be reasonable given that the prior temperature controlled machines bring the temperature of the dispensed product down to about 29 to 32 degrees F. inside the freezer tunnel. However, I have found these expectations to be unfulfilled by using a torque controlled shake freezer machine 40 to dispense the chocolate mush meltaway 50 of the invention.

Figure 5:
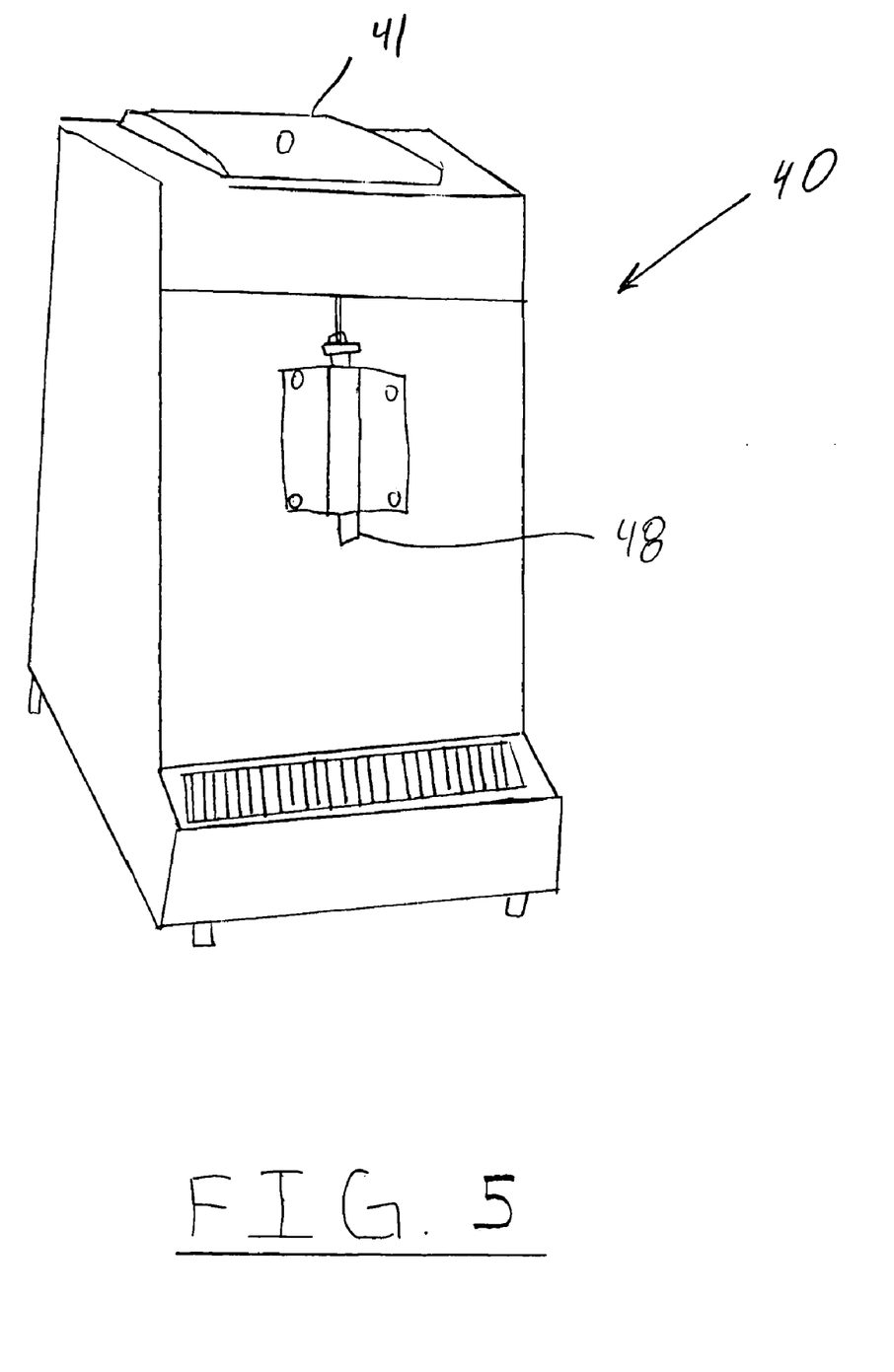
FIG. 5 is a simplified perspective view of a torque controlled shake freezer machine.

The torque controlled shake freezer machine 40 is shown in a simplified manner in FIGS. 5 and 6. I have found that a Model 490 shake freezer machine as marketed by the Taylor Company of Rockton, Ill., works very well. Other suitable machines are Model 60, Model 62, and Model 430 machines marketed by the Taylor Company. The machine has a mix hopper 41, a freezing tunnel 42 with a viscosity sensor or gauge 46, a viscosity control 47, and a dispenser 48. The freezing tunnel 42 has a side wall 43. The freezing tunnel further includes a shaft 44 and scrapers 45 for mixing ingredients inside the freezing tunnel 42 and for keeping any frozen ingredients within the freezing tunnel from building up on the side wall 43.

The mixture 15 poured into the machine hopper 41 flows to the freezing tunnel 42, step 104. The freezing tunnel 42 operates by cooling the side wall 43. The mixture within the freezing tunnel cools as it contacts the side wall 43. The freezing tunnel operates to cool the ingredients within the freezing tunnel until the viscosity sensor 46 senses that the viscosity of the ingredients within the freezing tunnel acquires the viscosity selected on the viscosity control 47. The Taylor machine measures viscosity by measuring the resistance to rotation of the shaft 44 within the freezing tunnel. That is, the torque required to rotate the shaft is an indirect measure of the viscosity and consistency of the product. Although torque measurement is the preferred way of determine the viscosity and consistency of the product, other ways are also contemplated to be within the scope of the present invention. The freezing tunnel can intermittently operate to automatically maintain the viscosity of the mixture inside the freezing tunnel, step 105.

In operation, a person sets the viscosity control 47 such that the mixture 15 has the desired viscosity and consistency, which is preferably like that of soft butter, soft-serve ice cream, or custard. In this regard, the freezing tunnel 42 cools the mixture 15 until the viscosity sensor 46 senses that the viscosity of the mixture has achieved the selected viscosity. The freezing tunnel 42 then shuts off. Thus, the operation of the shake freezer machine is automatically governed by the torque exerted on the mixture at the desired viscosity and consistency and not by any temperature settings. The temperature of the freezing tunnel never lowers the mixture temperature much below the mixture melting point. Consequently, the mixture stays in a mushy state and never hardens into a solid state. I have found that the desired viscosity can be adequately maintained in step 105 by intermittent operation of the freezing tunnel. This step 105 of intermittent operation of the freezing tunnel cools the mixture in combination with mixing it, or it can comprise merely continued mixing of the mixture in a semi-solid state, thus preventing the chocolate 7 from freezing on the inside of the freezer tunnel wall 43. The particular ingredients, as well as their relative proportions, determine the temperature at which the desired viscosity and consistency of the mush meltaway occurs. A typical temperature for ingredients that use real chocolate and 76 degree coconut oil is a range of about 70 and 80 degrees F. On the other hand, a mixture that uses soy oil would have a desired viscosity and consistency at a much lower temperature of approximately 30 to 35' degrees. As mentioned, the torque controlled shake freezer machine 40 automatically maintains the proper mixture viscosity and consistency regardless of the temperature at which that viscosity and consistency occur.

The last step 106, according to the method 100 of the present invention, is to dispense the mush meltaway 50 into a selected receptacle 55 as an individual serving at a consumer's request. Wafer ice cream cones are acceptable receptacles 55. However, other receptacles such as dishes, cups, and glasses can be used without departing from the broad aspects of the present invention. The mush meltaway 50 conforms to the shape of the cone or other receptacle 55 when it is dispensed, as shown in FIG. 6.

It is noteworthy that the freezing tunnel 42 can be replenished with liquid mixture 15 from the hopper 41 as required, either continuously or intermittently, after a selected amount of chocolate mush meltaway 50 is dispensed from the dispenser 48. The refilling of the freezing tunnel 42 can be accomplished automatically by the torque controlled shake freezer machine 40. It is apparent that the machine 40, because the freezing tunnel is capable of being continuously replenished, can be used to continuously create and dispense the chocolate mush meltaway 50.

It will also be understood that toppings 10 can be added to the chocolate mush meltaway 50 after it has been dispensed into a container 55.

An outstanding advantage of the present invention is that there is no need to control the ambient temperature of the room containing the shake freezer machine 40. The temperature of the machine freezing tunnel 42 is unrelated to the temperature of the room. A major manufacturing drawback associated with the conventional method of manufacturing meltaways is therefore eliminated.

As a further advantage of the present invention, the shake freezer machine can be adapted for continuous or near continuous dispensing of the mush meltaway. In this regard, the mixture is automatically replenished in the freezing tunnel from the hopper as mush meltaway is dispensed from the machine. The rate of manufacture of the mush meltaway is streamlined, and it is not dependent upon the rate at: which successive batches of prior meltaway centers 33 can be produced and coated with the coatings 34.

By means of the present invention, consumers have available a soft-serve chocolate product at retail store locations in the same manner that soft-serve ice cream, malts, shakes, and yoghurts were previously available to them.

Figure 7:
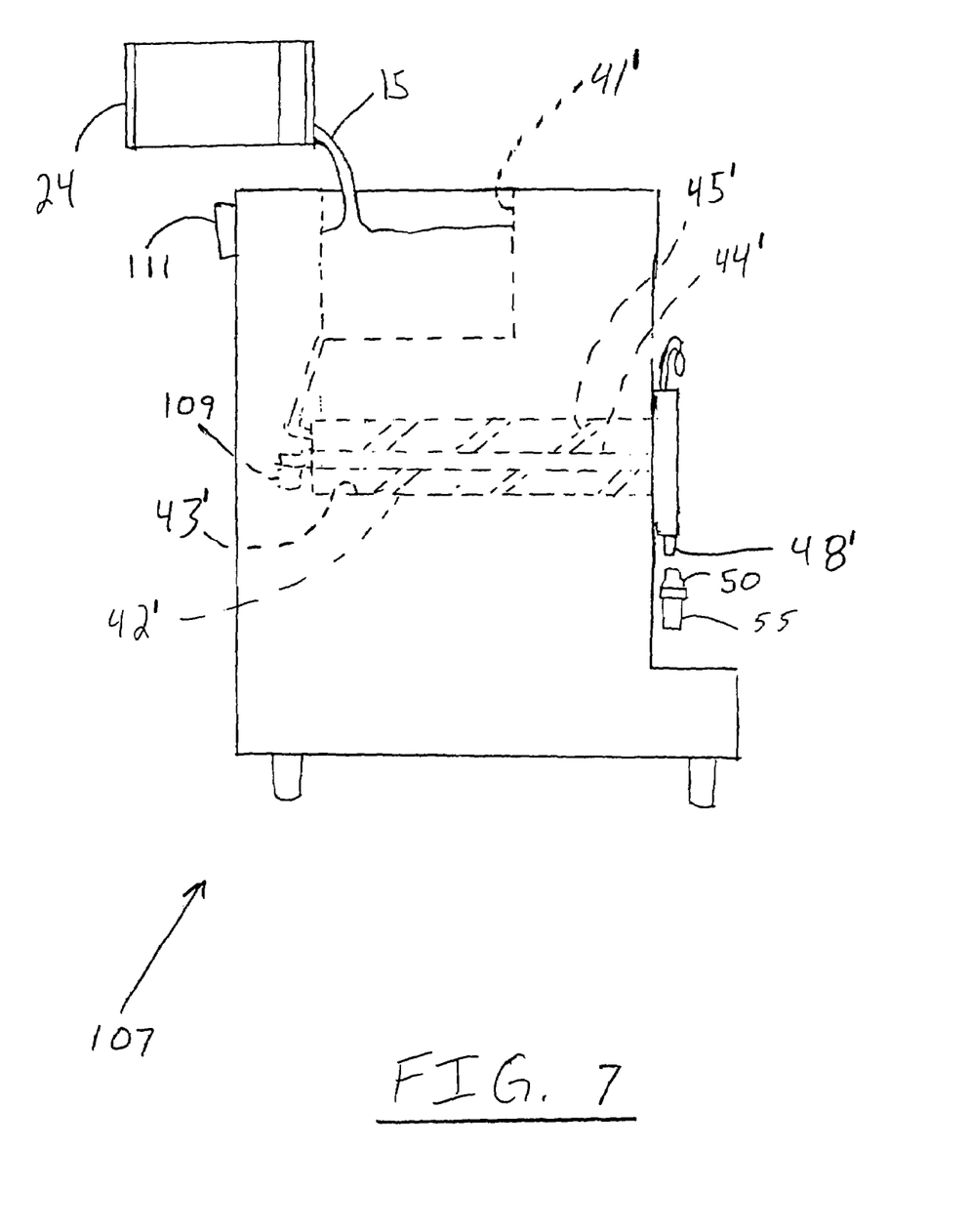
FIG. 7 is a view generally similar to FIG. 6, but showing a temperature controlled shake freezer machine as used with the present invention.

In a modified embodiment of the present invention, a temperature controlled soft-serve ice cream or shake freezer machine 107 is used to dispense the mush meltaway 50, FIG. 7. The temperature controlled ice cream or shake freezer machine 107 has a mix hopper 41', a freezer tunnel 42' with a temperature sensor 109, a thermostat 111, and a dispenser 48'. The freezing tunnel 42' has a side wall 43'. The freezing tunnel 42' further includes a shaft 44' and scrapers 45' for mixing ingredients inside the freezing tunnel and for keeping any frozen ingredients within the freezing tunnel from building up on the side wall 43'. The temperature controlled shake freezer machine normally operates the freezing tunnel to be approximately 29 to 32 degrees F. for making typical known soft-serve ice cream products.

To use the temperature controlled soft-serve ice cream or shake freezer machine 107 for making the mush meltaway 50, the machine thermostat 111 is altered or programmed to cause the freezing tunnel temperature to duplicate what the torque controlled shake freezer machine 40 does automatically. That is, the thermostat is modified for operation with the mush meltaway mixture 15 instead of with conventional soft-serve ice cream products. In particular, the thermostat is modified to operate at a temperature range of about 70 to 80 degrees F. instead of the usual operating range of about 29 to 32 degrees. The modified operating range can be narrowed to suit a specific mixture, if desired, such as a range of about 74 to 77 degrees. On the other hand, if oils such as soy oil are used for the mush meltaway, the temperature controlled soft-serve ice cream or shake freezer machine operates at a temperature of approximately 30 to 35 degrees. In that case, the machine thermostat may not have to be altered or programmed from is normal operating temperatures as used with traditional soft-serve ice cream mixes. For any desired temperature range, the temperature controlled ice cream or shake freezer machine operates automatically in the same manner as the torque controlled shake freezer machine 40 described previously.

EXAMPLE

A particularly tasty and convenient chocolate mush meltaway 50 is made from a natural chocolate 6 that melts at approximately 90 degrees F. A suitable source for the chocolate is the Blommer Company. Forty pounds of the chocolate are warmed to a temperature of approximately 140 degrees, at which temperature it is a liquid. After a short stirring time of about five minutes, the liquid chocolate is poured into a mixing kettle. Then eight pounds of a coconut oil 8 having a melting point of 76 degrees are added to the hot chocolate. A suitable coconut oil is marketed under the trademark Konut. Also, two ounces of fluor salt are added to the kettle. The chocolate, oil, and salt are mixed thoroughly. After a mixing time of about ten minutes, the mixture 15 has fallen to a temperature of about 120 degrees. The mixture is transferred from the kettle into storage containers 24 for transporting to the location where the mush meltaway will be dispensed and consumed. Preferably, the mixture is transported and stored at a temperature above 94 degrees.

At the dispensing location, the mixture 15 is poured from the containers 24 into a shake freezer machine 40. The machine viscosity control 47 is set to produce a viscosity and consistency of the mixture that is like soft butter, custard, or soft-serve ice cream. Although the ideal temperature of the mixture is approximately 75 to 77 degrees F., the desired mixture viscosity and consistency are actually produced without direct regard for the temperature of the mixture. The mixture is dispensed on demand as a chocolate mush meltaway 50 into the desired receptacles 55.

In this example, the ideal viscosity and consistence of the chocolate mush meltaway 50 are achieved when the mixture temperature is about 74 to 77 degrees F. However, that temperature is only indirectly sensed, because it is the torque produced on the rotating arm in the torque controlled machine 40 that governs the viscosity and consistence. Further, it will be appreciated that for a chocolate 7, oil 8, and salt 9 other than those selected for this example, the ideal viscosity and consistence of the chocolate mush meltaway may be achieved when the mixture temperature is other than about 74 to 77 degrees F.

Thus it is apparent that there has been provided, in accordance with the invention, a chocolate mush meltaway and method of making the same that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of making a chocolate mush meltaway comprising the steps of:
   a. providing a predetermined amount of melted chocolate having a chocolate melting temperature;
   b. providing a predetermined amount of oil, and a predetermined amount of salt;
   c. mixing the melted chocolate, oil, and salt into a mixture;
   d. providing a machine comprising:
      i. a hopper;
      ii. a freezing tunnel with a shaft and scraper rotatable therein; and
      iii. a dispenser;
   e. pouring the mixture into the machine hopper;
   f. drawing the mixture into the freezing tunnel;
   g. operating the freezing tunnel and transforming the mixture into a semi-solid mush meltaway having the viscosity and consistency of soft butter, custard, or soft-serve ice cream; and
   h. dispensing the semi-solid mush meltaway from the machine dispenser into a selected receptacle, wherein the step of dispensing the semi-solid mush meltaway comprises the step of attaining a mush meltaway temperature of about 70 to 80 degrees Fahrenheit prior to dispensing the semi-solid mush meltaway.

2. The method of claim 1 comprising the further step of intermittently and automatically operating the freezing tunnel to maintain the desired viscosity and consistency of the semi-solid mush meltaway.

3. The method of claim 1 wherein the step of providing a predetermined amount of oil comprises the step of providing an amount of oil in a ratio of approximately one part oil to five parts chocolate by weight.

4. The method of claim 1 comprising the further step of adding a predetermined amount of a selected flavor to the mixture prior to the step of pouring the mixture into the machine hopper.

5. The method of claim 1 wherein the step of pouring the mixture into the machine hopper comprises the step of attaining a mixture temperature greater than about 94 degrees Fahrenheit prior to pouring the mixture.

6. The method of claim 1 wherein:
   a. the step of providing a machine comprises the step of providing a modified torque controlled shake freezer machine; and
   b. the step of operating the freezing tunnel comprises the step of rotating the shaft and scraper in the freezing tunnel and sensing the torque on the rotating shaft and scraper.

7. The method of claim 1 wherein:
a. the step of providing a machine comprises the step of providing a modified temperature controlled soft-serve ice cream or shake freezer machine having a thermostat; and
b. the step of operating the freezing tunnel comprises the step of operating the thermostat to control the freezing tunnel and transforming the mixture into the semi-solid mush meltaway.

8. The method of claim 1 comprising the further step of pouring the mixture into a portable container subsequent to mixing the melted chocolate, oil, and salt and prior to pouring the mixture into the machine hopper.

9. The method of claim 8 wherein the step of pouring the mixture into a portable container comprises the step of pouring the mixture into the portable container at a temperature of approximately 120 degrees F.

10. The method of claim 8 wherein the step of pouring the mixture into a portable container comprises the step of pouring the mixture into the portable container at a temperature higher than the chocolate melting temperature.

11. In combination:
a. a modified shake freezer machine comprising:
  i. a hopper;
  ii. a freezing tunnel connected to the hopper; and
  iii. a dispenser connected to the freezing tunnel;
b. a mixture comprising chocolate, oil, and salt in a selected ratio and poured into said machine hopper and flowing into the machine freezing tunnel, the mixture being transformable in the machine freezing tunnel into a semi-solid mush meltaway having the viscosity and consistency of soft butter, custard, or soft-serve ice cream, wherein the viscosity and consistency of the semi-solid mush meltaway is achieved when said mixture has a temperature of approximately between 70 and 80 degrees Fahrenheit, the mixture being dispensable from the machine dispenser; and
c. a receptacle for receiving the semi-solid mush meltaway from the machine dispenser.

12. The combination of claim 11 wherein said freezing tunnel is intermittently and automatically operable to maintain said semi-solid mush meltaway at the viscosity and consistency of soft butter, custard, or soft-serve ice cream.

13. The combination of claim 11 wherein the viscosity and consistence of said the semi-solid mush meltaway is achieved when said mixture has a temperature of approximately between 74 and 77 degrees Fahrenheit.

14. The combination of claim 11 wherein said semi-solid mixture dispensed from the machine dispenser conforms to the shape of said receptacle.

15. The combination of claim 11 wherein said container consists of an edible wafer cone.

16. The combination of claim 11 wherein the modified shake freezer machine is a modified torque controlled shake freezer machine.

17. The combination of claim 11 wherein the shake freezer machine is a temperature controlled soft-serve ice cream or shake freezer machine.

18. A method of distributing a selected amount of chocolate mush meltaway to a consumer comprising the steps of:
a. providing a mixture comprising selected amounts of chocolate, oil, and salt at a first location,
b. transporting the mixture to a second location remote from the first location;
c. providing a dispensing machine at the second location wherein the step of providing a dispensing machine comprises the step of providing a modified torque controlled shake freezer machine;
d. pouring a selected amount of the mixture into the dispensing machine;
e. transforming the mixture into a semi-solid mush meltaway having a selected viscosity and consistency; wherein the step of transforming the mixture comprises the step of attaining a temperature for the chocolate mush meltaway of between approximately 70 and 80 degrees F., and
f. dispensing a selected amount of the mush meltaway from the dispensing machine for immediate consumption by a consumer.

19. The method of claim 18 wherein:
a. the step of providing a mixture comprises the step of providing a mixture having a temperature of approximately 120 degrees F.;
b. the step of transporting the mixture comprises the step of pouring the mixture at approximately 120 degrees F. into a storage container; and
c. the step of pouring a selected amount of the mixture comprises the step of pouring a selected amount of the mixture from the storage container into the dispensing machine.

20. The method of claim 18 wherein:
a. the step of providing a mixture comprises the step of providing a selected amount of a chocolate having a chocolate melting temperature; and
b. the step of pouring a selected amount of the mixture comprises the step of pouring the selected amount of the mixture into the dispensing machine at a temperature higher than the chocolate melting temperature.

21. A method of distributing a selected amount of chocolate mush meltaway to a consumer comprising the steps of:
a. providing a mixture comprising selected amounts of chocolate, oil, and salt at a first location;
b. transporting the mixture to a second location remote from the first location;
c. providing a dispensing machine at the second location wherein the step of providing a dispensing machine comprises the step of providing a modified temperature controlled soft-serve ice cream or shake freezer machine;
d. pouring a selected amount of the mixture into the dispensing machine;
e. transforming the mixture into a semi-solid mush meltaway having a selected viscosity and consistency; wherein the step of transforming the mixture comprises the step of attaining a temperature for the chocolate mush meltaway of between approximately 70 and 80 degrees F., and
f. dispensing a selected amount of the mush meltaway from the dispensing machine for immediate consumption by a consumer.

22. The method of claim 21 wherein:
a. the step of providing a mixture comprises the step of providing a mixture having a temperature of approximately 120 degrees F.;
b. the step of transporting the mixture comprises the step of pouring the mixture at approximately 120 degrees F. into a storage container; and
c. the step of pouring a selected amount of the mixture comprises the step of pouring a selected amount of the mixture from the storage container into the dispensing machine.

23. The method of claim 21 wherein:
a. the step of providing a mixture comprises the step of providing a selected amount of a chocolate having a chocolate melting temperature; and
b. the step of pouring a selected amount of the mixture comprises the step of pouring the selected amount of the mixture into the dispensing machine at a temperature higher than the chocolate melting temperature.

* * * * *

UNITED STATES PATENT AND TRADEMARK OFFICE
CERTIFICATE OF CORRECTION

| | | |
|---|---|---|
| PATENT NO. | : 7,309,509 B1 | Page 1 of 1 |
| APPLICATION NO. | : 10/741342 | |
| DATED | : December 18, 2007 | |
| INVENTOR(S) | : William C. Oaks | |

It is certified that error appears in the above-identified patent and that said Letters Patent is hereby corrected as shown below:

Title Page

Item (74) Attorney, Agent or Firm – delete "Ryan Kromholz and Manion" and insert -- Ryan Kromholz and Manion, S.C. --

Column 11, line 45, delete "consistence" and insert -- consistency --

Column 11, line 45, after "of said" delete -- the --

Column 12, line 46, delete outline letter "c" and insert outline letter -- e --

Signed and Sealed this

Twenty-fourth Day of November, 2009

David J. Kappos
*Director of the United States Patent and Trademark Office*